Dec. 27, 1960 C. C. HORNE 2,965,955
PRODUCTION OF HOLLOW TURBINE BLADES
Filed Oct. 22, 1957 2 Sheets-Sheet 1

CAMPBELL C. HORNE
Inventor

By

Attorney

Dec. 27, 1960   C. C. HORNE   2,965,955
PRODUCTION OF HOLLOW TURBINE BLADES
Filed Oct. 22, 1957   2 Sheets-Sheet 2
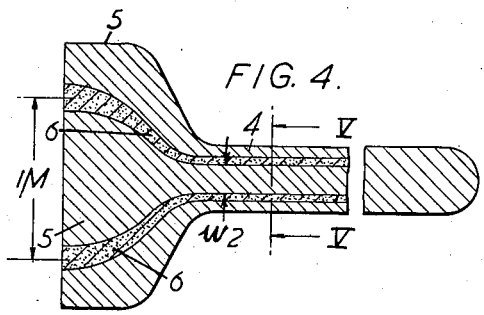
FIG. 4.
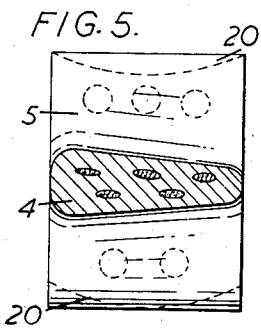
FIG. 5.
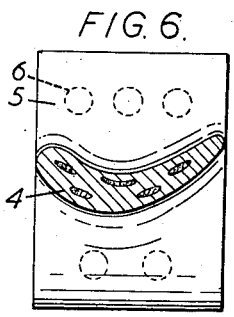
FIG. 6.
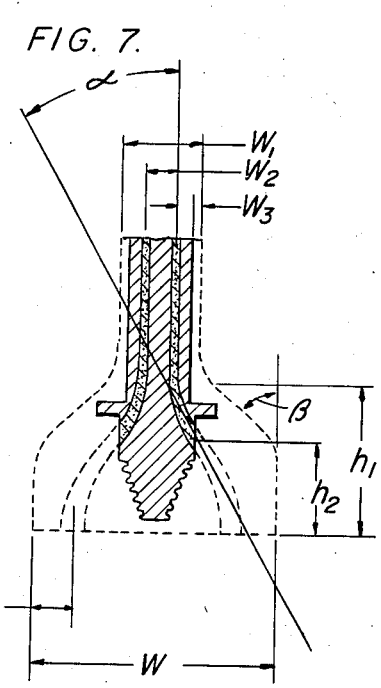
FIG. 7.
FIG. 8.
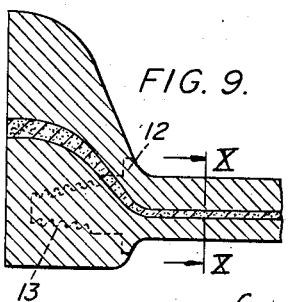
FIG. 9.
FIG. 10.
CAMPBELL C. HORNE
Inventor
By
Attorney

# United States Patent Office 2,965,955
Patented Dec. 27, 1960

2,965,955
PRODUCTION OF HOLLOW TURBINE BLADES

Campbell C. Horne, Giffnock, Scotland, assignor to The International Nickel Company, Inc., New York, N.Y., a corporation of Delaware Filed Oct. 22, 1957, Ser. No. 691,730

Claims priority, application Great Britain Oct. 23, 1956

2 Claims. (Cl. 29—156.8)

My invention relates to the manufacture of turbine and compressor blades containing longitudinal passageways for coolant in which a blade proper and a root are integral with one another and with a small flange or platform acting as a gas seal at the junction of the said blade proper and the root.

Such passageways cannot be made by drilling the blades. I make them preferably by drilling holes in a billet or the like, filling the holes with a material that has flow characteristics similar to those of the metal of the billet or the like and that can subsequently be removed by acid-leaching or otherwise, and hot-working the billet or the like to form a blank in which the holes are elongated. The hot-working may comprise partial extrusion through a die of aerofoil or other shape. The root is formed from that part of the blank which has not passed through the extrusion die, and the blade proper is formed from the extruded part by die forging or otherwise.

In the blades hitherto made by this method the ends of the passages have been in the end of the root.

In some turbine or compressor blades it is required that the ends of the cooling passages should lie in one or both sides of the root, i.e. on the side of the root adjacent the platform and remote from the tip. My object is to make a blade with such passages by the partial-extrusion method.

According to this invention the filled holes in the billet are made parallel to but displaced from the axis, the billet is partially extruded through a die of blade or near blade section to form a blank in which the filled passages in the unextruded metal are at some part of their length inclined to the axis, and the root and flange are then shaped by machining the unextruded end of the blank, the said inclined lengths of the holes being intersected by the machined surfaces so that they are exposed in one or both sides of the root.

Figure 1:
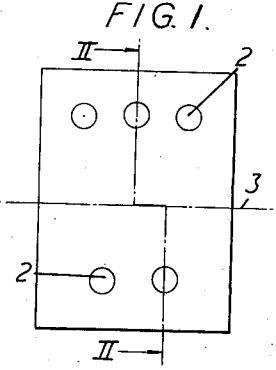
Figure 2:
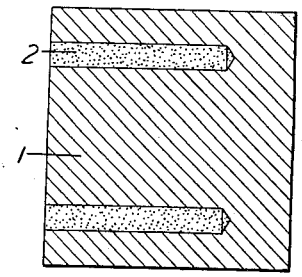
Figure 3:
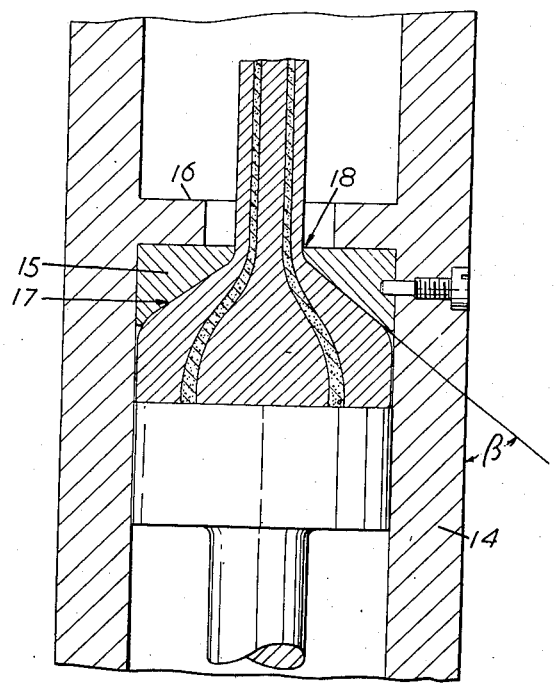

Methods of carrying out the invention will now be described in more detail with reference to the accompanying drawings, in which:

Figure 1 is an end view of the billet;
Figure 2 is a section on the line II—II in Figure 1;
Figure 3 shows the billet in an extrusion press;
Figure 4 is a longitudinal section through a blank made by extrusion in the press shown in Figure 3;
Figure 5 is a section on the line V—V in Figure 4;
Figure 6 is a section at a section station corresponding to V—V (Figure 5) after forging of the blank;
Figure 7 is a longitudinal section through the root end of the blade after the machining of the blank, superimposed over the unextruded root metal (in broken lines);
Figure 8 is an end view of another billet;
Figure 9 is a longitudinal section through part of the extrusion product made from this billet; and
Figure 10 is a section on the line X—X in Figure 9.
In the process illustrated by Figures 1 to 7, the starting material is a parallelepiped billet 1 of a high temperature creep-resisting nickel-chromium or nickel-chromium-cobalt alloy. Five blind holes 2 are drilled in this billet, three in one side of the central plane 3 and two on the other side. The holes are then filled with filler material, e.g. an iron-manganese-titanium alloy, as described and claimed in U.S. application, Serial No. 509,380.

Next the billet is inserted in the container 14 of an extrusion press such that the extrusion axis is contained by the said central plane and extruded through the orifice of a die 15 which is held in position by a retaining member 16. The die 15 accurately fits the container 14 and has two inclined faces 17 which merge into a die orifice 18 of pseudo aerofoil section, Figure 5.

The extrusion is stopped while some of the metal remains in the container 14, so that the partially extruded product is the blank shown in Figure 4. Figure 5 shows the shape of the extruded length 4, which is of course determined by the shape of the die orifice. This length forms the blade proper in the finished product, and along it the holes are converted from circular to lenticular cross-section.

The root is formed from the wider part 5 which has not passed through the die. In this part 5 (Figure 4) the ends of the holes are unaltered in position, and as the distance $W_1$ between the two rows is large in comparison with the distance $w_2$ between the same two rows in the part 4 the holes become considerably inclined to the central longitudinal plane and follow the flow lines of the extruded product as shown at 6. This inclination is inter alia determined to a marked degree by the inclination ($\beta$) of the faces 17 of the die (Fig. 7).

Opposite sides of the part 5 to form the root are next converted to the shape shown by broken lines 20 in Figure 5, and then the part to form the blade proper 4, of the blank is stamped to a cambered form, Fig. 5. Alternatively, the length 4 may be machined to the cross-section required at each station and stamped with no change in the length of the part 4. Alternatively, the conversion may be effected by gap rolling, in which case the length of the part 4 may be changed. In the case where the part 4 is of the desired cross-section at each point along its length it is hot-forged in a pair of closed dies without change in length to aerofoil section with change in taper and camber over its length, the cross-section being typified by the section shown in Figure 6. It is to avoid risk of tearing of the metal, particularly at the junction of the parts 4 and 5, during the die-forging that the sides of the part 5 are first shaped as shown at 20.

The part 5 of the extruded and forged blank is now machined to form a fir-tree root 8 and a flange or platform 9 as shown in Figure 7. Part of the machining intersects the inclined parts 6 of the holes and thus causes these holes to open into the sides of the root as shown at 10. The mouths of the holes at 10 are of slightly larger cross-sectional area than elsewhere in the blade body and this facilitates the entry of cooling air.

The solid leading end of the part 4 may be upset to form a shroud if desired.

It is of course necessary to expose the ends of the holes 2 at the blade tip or in the shroud, and this may be done by drilling holes to meet the filled holes. Alternatively the solid end may be cut off to expose the holes (assuming that no shoud is required). Naturally the total volume of the billet 1 and the length extruded to form the part 4 are made appropriate to the size of blade required.

Finally the filler is removed by acid leaching to leave the holes as cooling passages.

The invention may be used in the manufacture of a blade having a single row of cooling passages through a blade proper of aerofoil section. If these passages are to terminate in the side of the root, they must all lie in one side. Therefore holes 11 are drilled on one side of the central plane of the billet, as shown in Figure 8, and this billet is then extruded to the shape shown in full lines in Figure 9. The further manufacturing steps are the same as those described above and a platform 12 and fir-tree root 13 with the resultant passages terminating in one side is shown in dotted lines in Figure 9.

For the purpose of giving those skilled in the art an understanding of the invention and/or a better appreciation of the advantages of the invention, the following illustrative example is given for one blade I have made.

*Example*

A parallelepiped billet of nickel-chromium-cobalt alloy having the following composition:

| | |
|---|---|
| Carbon | 0.1 max. |
| Titanium | 1.8–3.0 |
| Chromium | 18–21 |
| Aluminium | 0.8–2.0 |
| Silicon | 1.5 max. |
| Manganese | 1.0 max. |
| Iron | 5.0 max. |
| Cobalt | 15–21 |
| Nickel | Balance | is drilled with a pattern of five holes as shown in Figures 1 and 2. The hole diameter is 7/32" and the size of the billet 1.5" x 1.6" x 2.5 long. The holes are filled with iron-manganese-titanium filler rod of composition:

| | Percent |
|---|---|
| Manganese | 5–20 |
| Titanium | 1–10 |
| Carbon | Less than 0.5 |
| Iron | Balance |

The filled billet is then extruded at a temperature of 1160° C. in an extrusion press through a die orifice of the shape shown in Figure 5 having a width substantially equal to the width of the billet.

The root metal is then forged to give a curved shape shown in broken lines in Figure 5. Subsequently the root metal and the blade metal are forged simultaneously so that the root metal returns to the rectangular form. The section of the blade metal shown in Figure 5 is thereby converted to the near aerofoil form shown in Figure 6. Chord 1.6". Thickness 0.45". This simultaneous forging prevents tearing of the blade metal near its juncture with the root metal.

This extruded product gave the following measurements for the criteria shown in Figure 7:

| | | | |
|---|---|---|---|
| $W_1$ | 1.67" | $w_1$ | 0.45" |
| $W_2$ | 0.43" | $w_2$ | 0.25" |
| $h_1$ | 1.32" | $w_3$ | 0.1" |
| $h_2$ | 1.05" | $\beta$ | 90° |
| $\alpha$ | 33° | | |

Machining of the fir-tree root is then effected causing the ends of the filled holes to be exposed in the side wall of the root. The near aerofoil is then machined to accurate aerofoil shape. Finally, the filler material is leached to empty the filled holes in the blade.

I claim:

1. A process for the manufacture of a turbine blade blank having a root portion integral with a blade portion, a flange at the junction of the root portion and the blade portion, a fir-tree portion adjacent the base of the root and plurality of cooling passages extending substantially longitudinally through said blade portion and opening on the side of the root portion intermediate the flange and the fir-tree portion of the root, which comprises providing a billet having a plurality of filled longitudinal holes extending therethrough, said holes being parallel to the axis of said billet and being spaced apart therefrom, partially extruding said billet longitudinally through a die to provide a partially extruded product having an extruded blade portion, an unextruded root portion and a transition portion intermediate thereto, said transition portion having an exterior surface grading from the unextruded cross-sectional dimension to the extruded cross-sectional dimension and having said filled passages inclined to the axis of the partially extruded product and thereafter machining the flange and the root from said product so that at least one of the sides of said root intersects the filled holes above the fir-tree portion of the root where said filled holes are inclined with respect to the axis of the product.

2. A process for the manufacture of a turbine blade blank having a root portion integral with a blade portion, a flange at the junction of the root portion and the blade portion, a fir-tree portion adjacent the base of the root and a plurality of cooling passages extending substantially longitudinally through said blade portion and opening on the side of the root portion intermediate the flange and the fir-tree portion of the root, which comprises providing a billet having a plurality of filled longitudinal holes extending therethrough, said holes being parallel to the axis of said billet and being spaced apart therefrom, partially extruding said billet longitudinally through a die to provide a partially extruded product having an extruded blade portion, an unextruded root portion and a transition portion intermediate thereto, said transition portion having an exterior surface grading from the unextruded cross-sectional dimension to the extruded cross-sectional dimension and having said filled passages inclined to the axis of the partially extruded product and thereafter machining the flange and the root from said product so that the sides of the said root intersect the filled holes above the fir-tree portion of the root where said filled holes are inclined with respect to the axis of the product.

References Cited in the file of this patent

UNITED STATES PATENTS

| | | |
|---|---|---|
| 1,430,399 | Parsons et al. | Sept. 26, 1922 |
| 2,013,622 | Bedford et al. | Sept. 3, 1935 |
| 2,628,417 | Peyches | Feb. 17, 1953 |
| 2,830,357 | Tunstall et al. | Apr. 15, 1958 |

FOREIGN PATENTS

| | | |
|---|---|---|
| 755,610 | Great Britain | Aug. 22, 1956 |